US009164254B2

(12) United States Patent
Chen et al.

(10) Patent No.: US 9,164,254 B2
(45) Date of Patent: Oct. 20, 2015

(54) OPTICAL COMPONENT AND IMAGE CAPTURING DEVICE USING SAME

(71) Applicant: CipherLab Co., Ltd., Taipei (TW)

(72) Inventors: Yi-Yung Chen, Taipei (TW); Pin-Chung Lin, Taipei (TW); Yung-Fu Chang, Taipei (TW)

(73) Assignee: CIPHERLAB CO., LTD., Taipei (TW)

( * ) Notice: Subject to any disclaimer, the term of this patent is extended or adjusted under 35 U.S.C. 154(b) by 0 days.

(21) Appl. No.: 14/336,003

(22) Filed: Jul. 21, 2014

(65) Prior Publication Data

US 2015/0028105 A1    Jan. 29, 2015

(30) Foreign Application Priority Data

Jul. 29, 2013  (TW) .............................. 102127171 A (51) Int. Cl.
*G02B 7/02*   (2006.01)

(52) U.S. Cl.
CPC ...................................... *G02B 7/021* (2013.01)

(58) Field of Classification Search
CPC .............. G02B 7/021; G06K 7/10881; G06K 7/10702; G06K 7/10831
See application file for complete search history.

(56) References Cited

U.S. PATENT DOCUMENTS

2009/0140048 A1*  6/2009  Yu et al. ................... 235/462.35

* cited by examiner

*Primary Examiner* — Kristy A Haupt
(74) *Attorney, Agent, or Firm* — McClure, Qualey & Rodack, LLP (57) ABSTRACT

An optical component includes a substrate and two optical lenses, and the substrate and the two optical lenses are an integrated and inseparable structure. A groove that can accommodate a required collimating optical element is provided on the substrate, or a collimating optical element and the substrate are integrated. Because fabrication of optical elements is completed during fabrication of the optical component, the number of elements to fabricate and time and cost of fabricating the elements can be reduced. Also, during assembly of an image capturing device, it is only required that the optical component is locked to a body of the image capturing device to complete arrangement of a front panel and the optical elements, which can greatly simplify an assembly procedure and shorten assembly time.

9 Claims, 9 Drawing Sheets

OPTICAL COMPONENT AND IMAGE CAPTURING DEVICE USING SAME

CROSS-REFERENCES TO RELATED APPLICATIONS

This non-provisional application claims priority under 35 U.S.C. §119(a) on Patent Application No. 102127171 filed in Taiwan, R.O.C. on Jul. 29, 2013, the entire contents of which are hereby incorporated by reference.

BACKGROUND

1. Technical Field

The present invention is an optical component, and in particular, is an optical component applicable in an image capturing device of a barcode reading apparatus.

2. Related Art

With the improvement of optical encoding technologies, a barcode system, which has already taken the place of a complicated manual input manner, is widely applied in various fields and has advantages such as convenient control and management of products and materials, document processing and filing, and quick determination of commodity prices. A barcode reader is required to read information included in barcodes. The barcode reader mainly uses an image capturing device to capture a barcode image, and then analyzes and obtains data in a barcode by using an image processing program for subsequent application. In both a one-dimensional reading apparatus and a two-dimensional barcode reading apparatus, an image capturing device is arranged to scan and read a barcode to obtain data in the barcode.

A light-emitting diode is usually arranged inside an image capturing device used for reading and compiling a barcode system to produce a light ray, and required optical elements such as a lens and a diffusion sheet are arranged outside the light-emitting diode. Under the guidance of an optical member located on a light ray casting path, a barcode symbol is scanned, and widths and spaces in a code area of the barcode symbol are reflected into a barcode reader, so as to identify the scanned barcode symbol.

In addition, to enable a user to place a barcode within a range readable by a barcode reader, a collimated light source and a corresponding optical element are further arranged in an image capturing device, so as to cast a scanning area to enable the user to place a barcode at the center of an angle of view of image capturing.

For an existing image capturing device, optical elements are separately fabricated and then separately secured in front of light sources or at other positions as required. To cast a large range for quick reading of barcode information within the range, or to obtain a light source with high brightness to facilitate outdoor use, multiple light-emitting elements are usually arranged. A corresponding optical element is further arranged in front of each light-emitting element, which increases the number of optical elements and makes an assembly procedure more complicated.

In addition, to miniaturize an image capturing device in a barcode reader as much as possible to adapt to various electronic apparatuses such as a mobile phone and a personal digital assistant (PDA), an optical element also needs to be miniaturized. Therefore, the difficulty in arranging and positioning optical elements is also increased, and a yield may also be decreased.

SUMMARY

In view of this, the present invention provides an optical component of an image capturing device, including a substrate and two optical lenses. The substrate is provided with a perforation, a groove, and two opposite long sides. The perforation is located between the two long sides, the groove is arranged to be concave from a surface of the substrate towards the other surface to protrude from the other surface, and the groove is located at an end of one of the long sides. The two optical lenses are separately arranged to be convex from the other surface of the substrate and are located at two ends of the other long side of the substrate, where the two optical lenses and the substrate are an integrated and inseparable structure.

In addition, the present invention also provides an image capturing device, including a body, a first circuit board, an image capturing lens, a collimated light source, a second circuit board, two light-emitting elements, and the foregoing optical component. The body includes a first through hole and a second through hole. The first circuit board is securely arranged on the body. The image capturing lens is arranged in the first through hole and is electrically connected to the first circuit board. The collimated light source is arranged on the first circuit board and corresponds to the second through hole of the body. The second circuit board is securely arranged on a side, opposite the first circuit board, of the body. The two light-emitting elements are arranged on the second circuit board. The optical component is arranged on the second circuit board and is securely connected to the body. The two optical lenses on the optical component correspondingly cover the two light-emitting elements, respectively, and the groove correspondingly covers the second through hole.

In the present creation, optical elements, such as optical lenses used for a light-emitting element, that require to be used in an image capturing device are directly combined with a substrate covering a front end of the image capturing device. In this way, the optical lenses and the substrate are an integrated structure, and during fabrication of the substrate, the required optical lenses are also fabricated at the same time, which also reduces the number of elements to fabricate and time and cost of fabricating the elements. During assembly, it is only required that the substrate is locked to a body of the image capturing device to complete assembly and arrangement of a front panel and the optical element. Because optical elements do not need to be secured using an adhesive or arranged one by one, an assembly procedure can be greatly simplified, and assembly time is shortened. Moreover, at the same time when an optical element is formed, positioning of the optical element is completed, which also solves a problem of a yield decrease caused by position deviation of the optical element during arrangement.

Specific features and advantages of the present creation are described in detail below in the implementation manners. The following content is sufficient for a person skilled in the art to understand technical content of the present creation and implement the present invention there accordingly, and any person skilled in the art can readily understand relevant objectives and advantages of the present creation.

BRIEF DESCRIPTION OF THE DRAWINGS

The disclosure will become more fully understood from the detailed description given herein below for illustration only, and thus are not limitative of the disclosure, and where.

DETAILED DESCRIPTION

Figure 1:
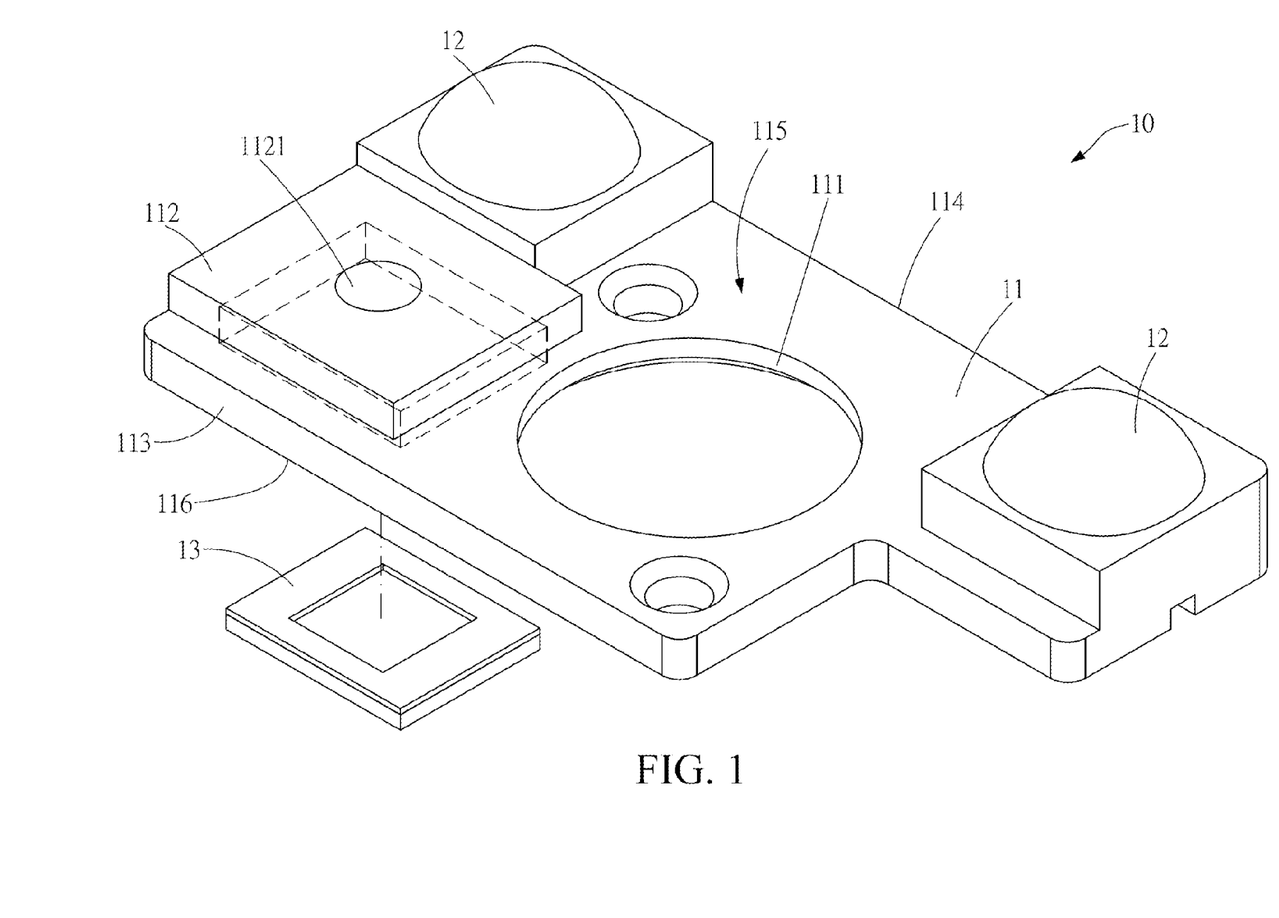
FIG. 1 is a perspective view (1) of an optical component according to a first embodiment of the present invention.
Figure 2:
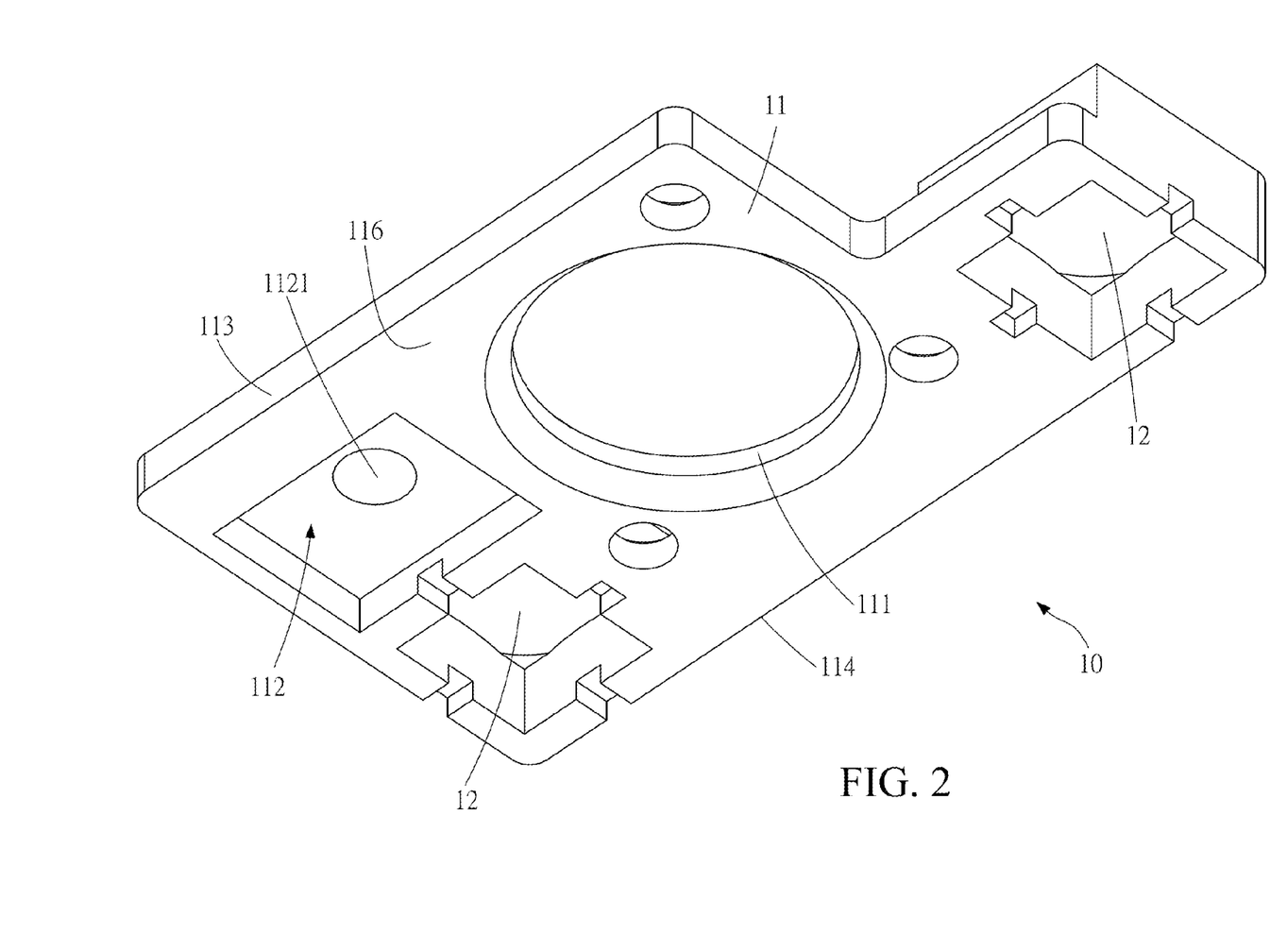
FIG. 2 is a perspective view (2) of the optical component according to the first embodiment of the present invention.

Refer to FIG. 1 and FIG. 2, which are perspective views from different angles of an optical component according to a first embodiment of the present invention. An optical component 10 in this embodiment includes a substrate 11, two optical lenses 12, and a collimating optical element. The substrate 11 is provided with a perforation 111, a groove 112, and two opposite long sides 113 and 114. The perforation 111 is located between the two long sides 113 and 114. The groove 112 is arranged to be concave from a second surface 116 of the substrate 11 towards a first surface 115 to protrude from the first surface 115, and the groove 112 is located at an end of one of the long sides. As shown in FIG. 1, the groove 112 is located at an end of the long side 113.

The two optical lenses 12 are separately arranged to be convex from the first surface 115 of the substrate 11 and are located at two ends of the other long side of the substrate 11. As shown in FIG. 1, the two optical lenses 12 are located at two ends of the long side 114. The two optical lenses 12 and the substrate are an integrated and inseparable structure. Therefore, during fabrication of the substrate, the two optical lenses 12 may be formed at the same time. In this way, the number of elements and time of fabrication can be reduced, and also cost of fabrication is also reduced.

The collimating optical element in this embodiment is a diffraction optical element 13 arranged in the groove 112, and a penetrating hole 1121 is provided at the center of the groove 112. In FIG. 1, the shape of the penetrating hole 1121 is circular. However, the shape may also be square, rhombic, elliptic, or irregular as long as a collimated light ray can pass through the penetrating hole 1121. In this embodiment, the circular shape is used for ease of fabrication.

Figure 3:
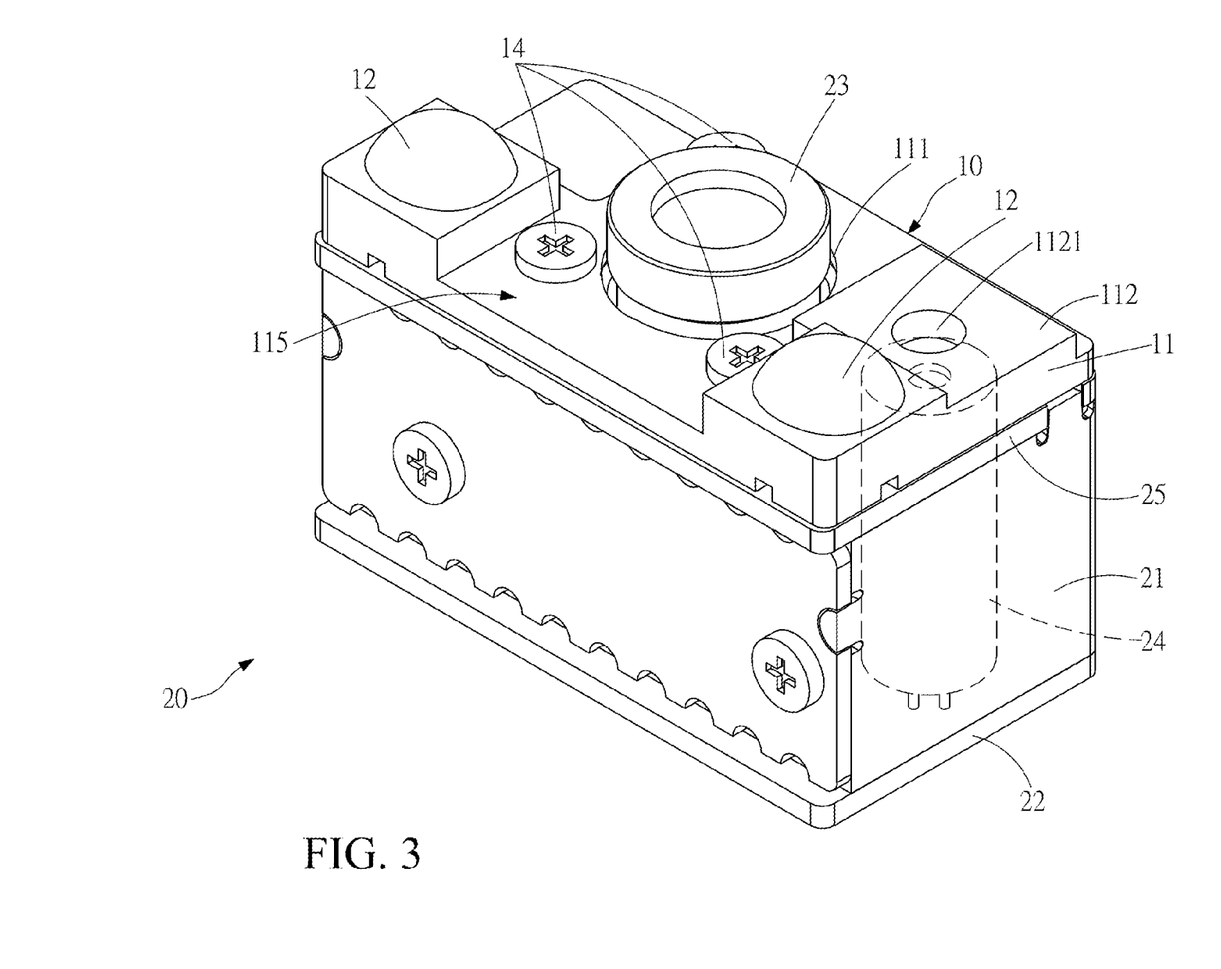
FIG. 3 is a perspective view of an image capturing device according to the first embodiment of the present invention.
Figure 4:
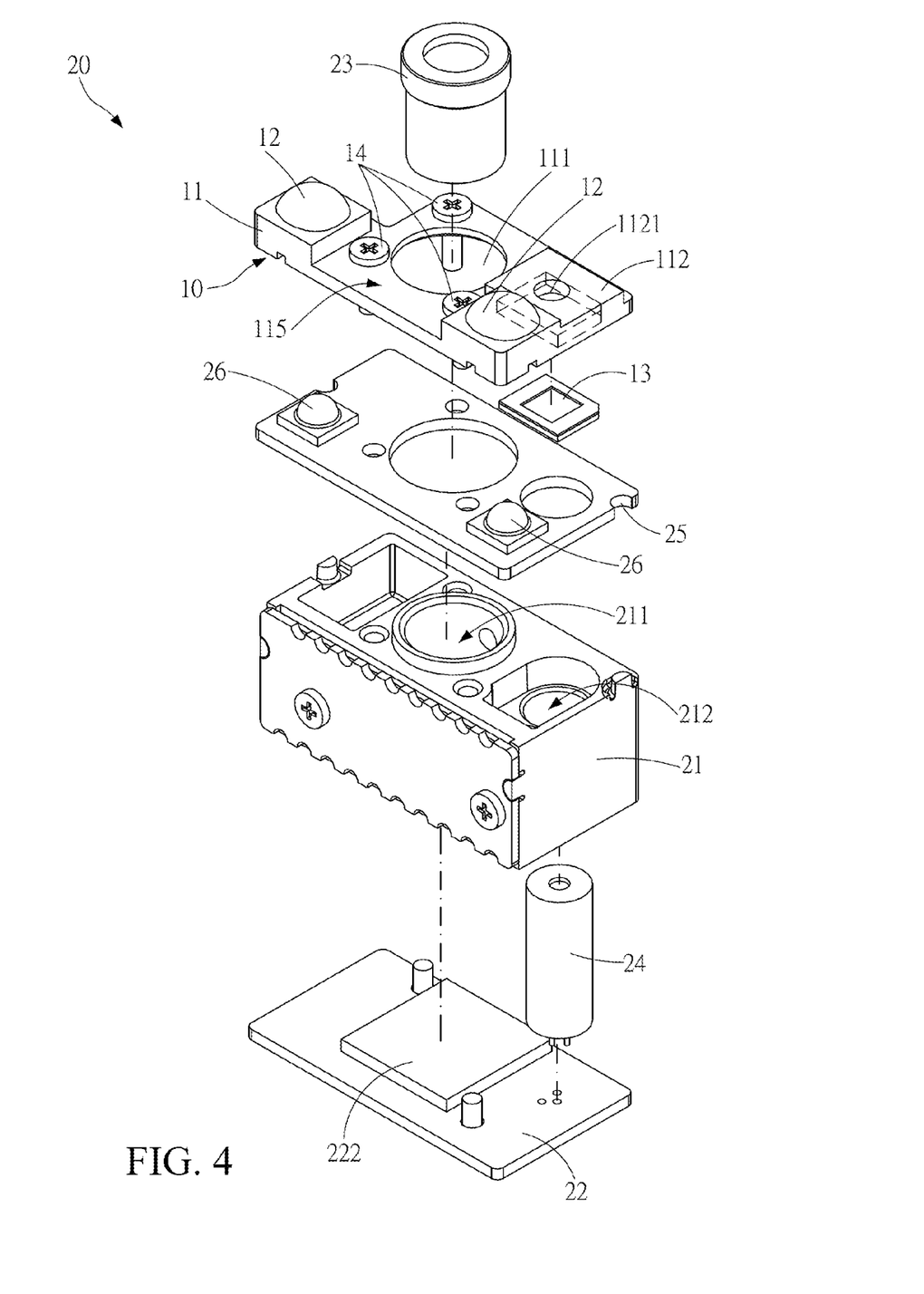
FIG. 4 is an exploded view of the image capturing device according to the first embodiment of the present invention.

Next, refer to FIG. 3 and FIG. 4, which are respectively a perspective view and an exploded view of an image capturing device 20 according to the first embodiment of the present invention. The image capturing device 20 in this embodiment includes: a body 21, a first circuit board 22, an image capturing lens 23, a collimated light source, a second circuit board 25, two light-emitting elements 26, and the foregoing optical component 10. The body 21 includes a first through hole 211 and a second through hole 212. As shown in FIG. 4, the first through hole 211 is located at the center of the body 11, and the second through hole 212 may be located on either the left or right side of the first through hole 211.

The first circuit board 22 is securely arranged on a lower surface of the body 21. In addition, the first circuit board 22 may include a photosensitive element 222, and the photosensitive element 222 corresponds to the first through hole 211 and is electrically connected to the first circuit board 22. The image capturing lens 23 is arranged in the first through hole 211. The collimated light source is arranged on the first circuit board 22 and corresponds to the second through hole 212. In this embodiment, the collimated light source is a laser light source 24, and is penetrated inside the second through hole 212. The second circuit board 25 is securely arranged on a side, opposite the first circuit board 22, of the body 21, that is, on an upper surface of the body 21. The two light-emitting elements 26 are arranged on the second circuit board 25 and are located on two corresponding sides of the second circuit board 25.

The foregoing optical component 10 is arranged on the second circuit board 25 and is securely connected to the body 21. As shown in FIG. 3 and FIG. 4, when the optical component 10 covers the second circuit 25, the two optical lenses 12 correspondingly cover the two light-emitting elements 26, respectively, and the groove 112 correspondingly covers the second through hole 212. In this embodiment, three screws 14 are used to pass through the optical component 10 and the second circuit board 25 and then are locked to the body 21, so as to securely connect the optical component 10 and the body 21.

Optical elements, such as the optical lenses 12 used for the light-emitting elements 26 and the collimating optical element used for the collimated light source, that require to be used in the image capturing device 20 are all arranged on the optical component 10. Therefore, it is only required that the optical component 10 is locked to the body 21 of the image capturing device 20 to complete assembly and arrangement of multiple optical elements. Moreover, because during fabrication of the optical component 10, the optical elements are already accurately arranged at positions as required, and no further positioning is needed during assembly and arrangement, which can also prevent position deviation of the optical elements during arrangement. Therefore, an assembly procedure can be greatly simplified, assembly time is shortened, and a problem of a reduced yield is also solved.

Figure 5A:
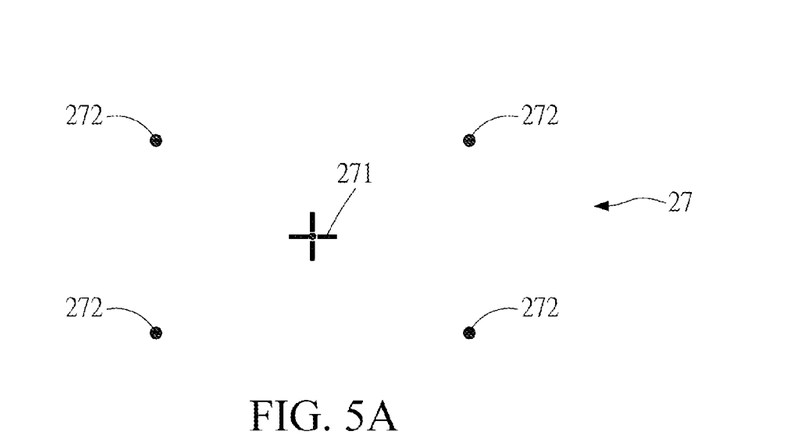
FIG. 5A to FIG. 5C are schematic views of various collimation patterns according to the first embodiment of the present invention.
Figure 5B:
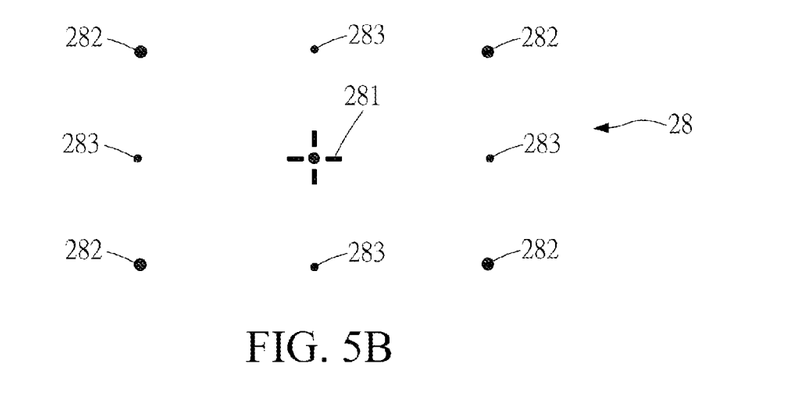
Figure 5C:
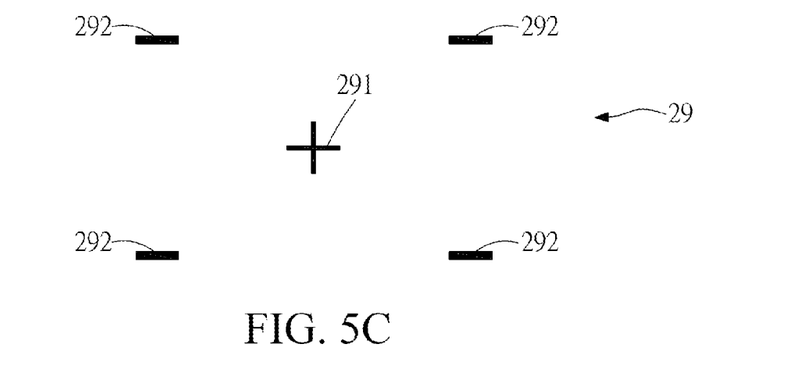

Next, refer to FIG. 5A, FIG. 5B, and FIG. 5C, which are collimation patterns formed by using different diffraction optical elements in the image capturing device 20 according to the first embodiment of the present invention. A user may design a desired collimation pattern to form according to demands, and further assembles and arranges corresponding diffraction optical elements in the image capturing device 20 in this embodiment, so as to improve accuracy of determining a barcode readable range by the user. For a collimation pattern 27 shown in FIG. 5A, a cross 271 with a dot at the center represents a central position, and four corners of a maximum readable range are represented by large dots 272, so as to indicate the readable range of the image capturing device 20.

In the collimation pattern 28 shown in FIG. 5B, a cross 281 with a dot is also used as a central position, but the dot at the center of the cross is enlarged, so as to make alignment of the central point easier. In addition, in addition to large dots 282 at four corners of a maximum readable range, there is also one small dot 283 between adjacent large dots 282, so as to make the readable range clearer.

In addition, as shown in a collimation pattern 29 shown in FIG. 5C, only a cross 291 without including a dot at the center represents a central position. A maximum readable range is represented by transverse lines 292 at four corners. To read a square or rectangular barcode, the transverse lines 292 make it easy to determine whether the barcode is within the readable range or make an adjustment.

Figure 6:
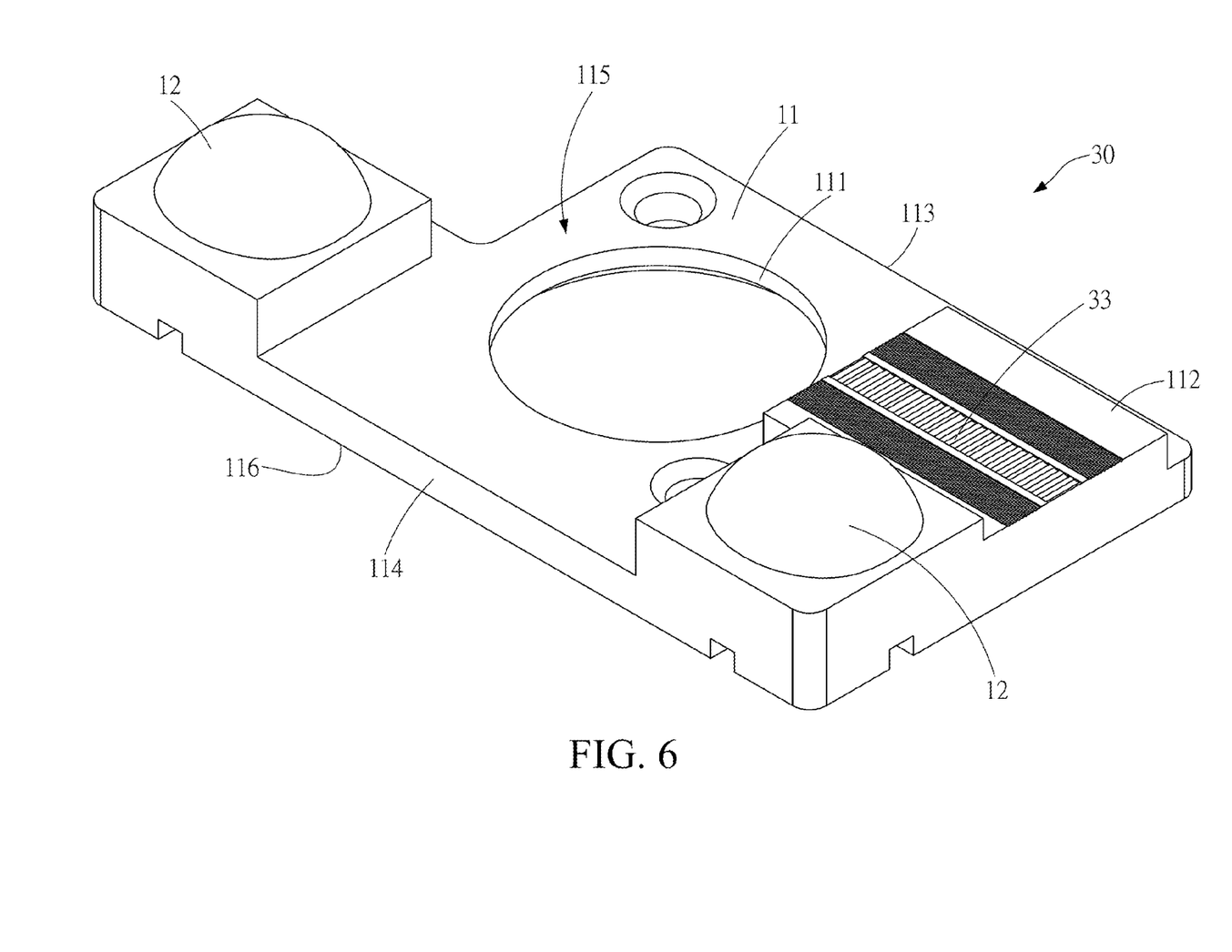
FIG. 6 is a perspective view of an optical component according to a second embodiment of the present invention.
Figure 7:
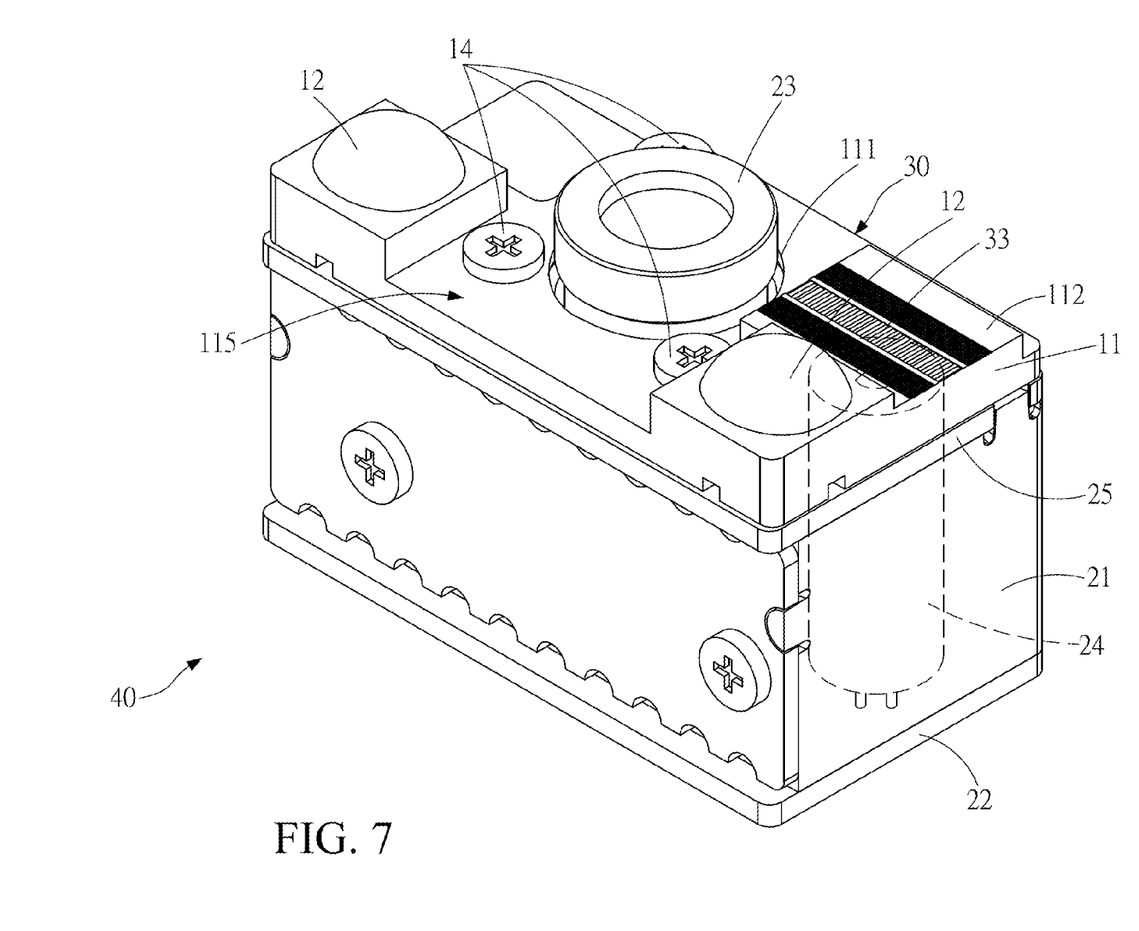
FIG. 7 is a perspective view of an image capturing device according to the second embodiment of the present invention.

Next, refer to FIG. 6 and FIG. 7, which are respectively perspective views of an optical component and an image capturing device using the same according to a second embodiment of the present invention. Those same between the optical component 30 in this embodiment same and that in the first embodiment are represented by same element numerals, and are no longer elaborated herein. A difference lies in that a collimating optical element in this embodiment is a grating element 33. In this embodiment, the grating element 33 is a two-dimensional grating element, and a one-dimensional grating element may also be used in another aspect, which is not limited in the present invention.

The grating element 33 is arranged on a groove 112 of a substrate 11. The grating element 33 may be arranged in the groove 112 of the substrate 11 in a manner of tight fitting, securing using an adhesive, or integration. In this embodiment, the grating element 33 and the groove 112 of the substrate 11 are an integrated and inseparable structure. At the same time when the substrate 11 is formed through injection molding, the grating element 33 is also formed. In this way, time of fabrication and assembly of elements can be reduced, so as to shorten a process and reduce fabrication cost.

In another aspect, a rectangular hole may also penetrate into the groove, and then the grating element 33 is placed in the rectangular hole in a manner of tight fitting or adhesion, so as to be combined with the groove of the substrate. This manner is applicable to a case in which a grating element with a fine structure needs to be used. This is because a very fine structure cannot be formed through common plastic injection molding. Therefore, the required grating element may be fabricated in other manners such as a semiconductor process and then assembled into the groove of the substrate. Moreover, this arrangement manner also provides flexibility in element replacement. To replace a one-dimensional grating element with a two-dimensional grating element, only the grating element needs to be replaced without needing to fabricate an entire optical component again.

In addition, because the grating element 33 is used as a collimating optical element, it is more appropriate to use a laser light source as a collimated light source, so that a light ray can pass through the grating element to form a collimation pattern. Therefore, same as that in the first embodiment, a laser light source 24 is also used as a collimated light source in an image capturing element 40 in this embodiment.

Figure 8:
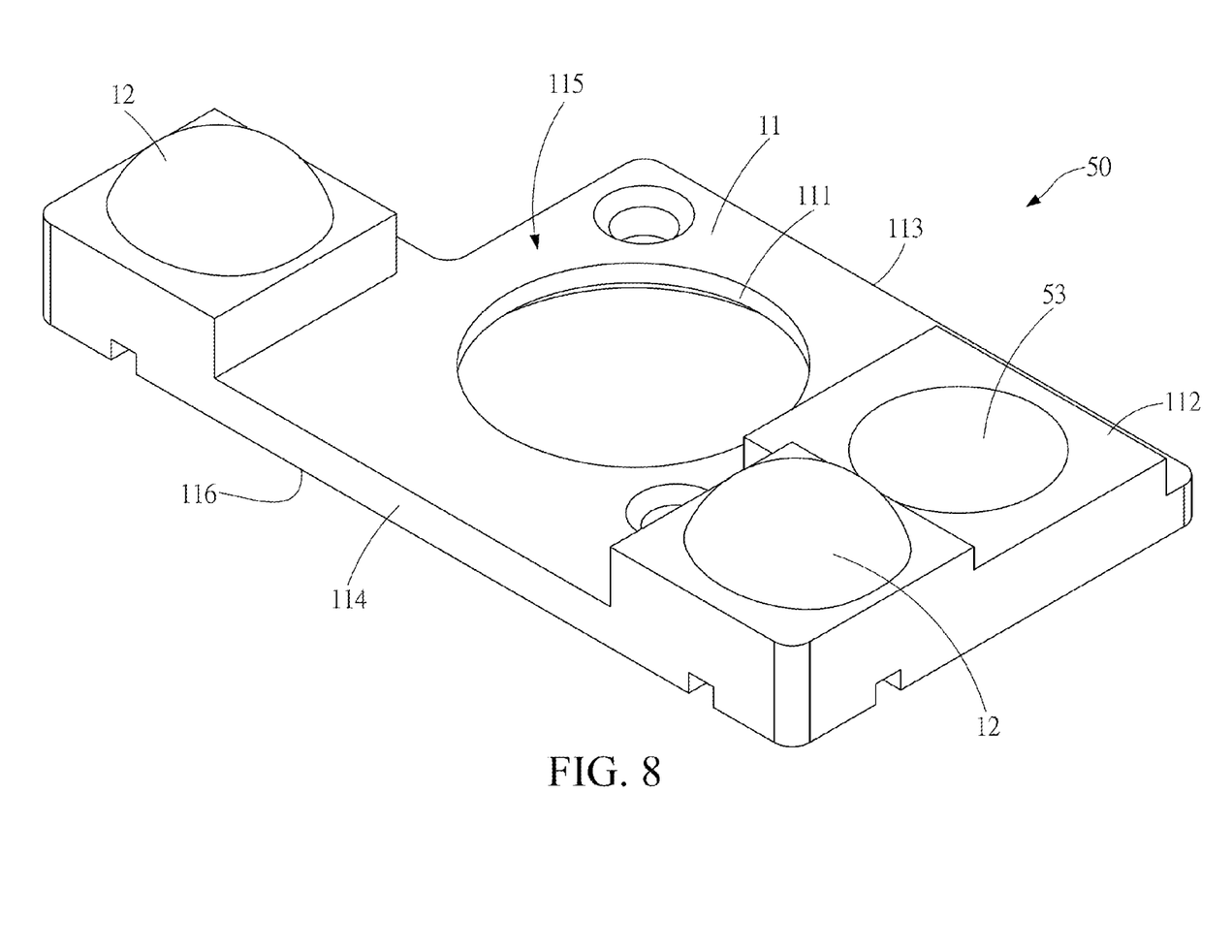
FIG. 8 is a perspective view of an optical component according to a third embodiment of the present invention.
Figure 9:
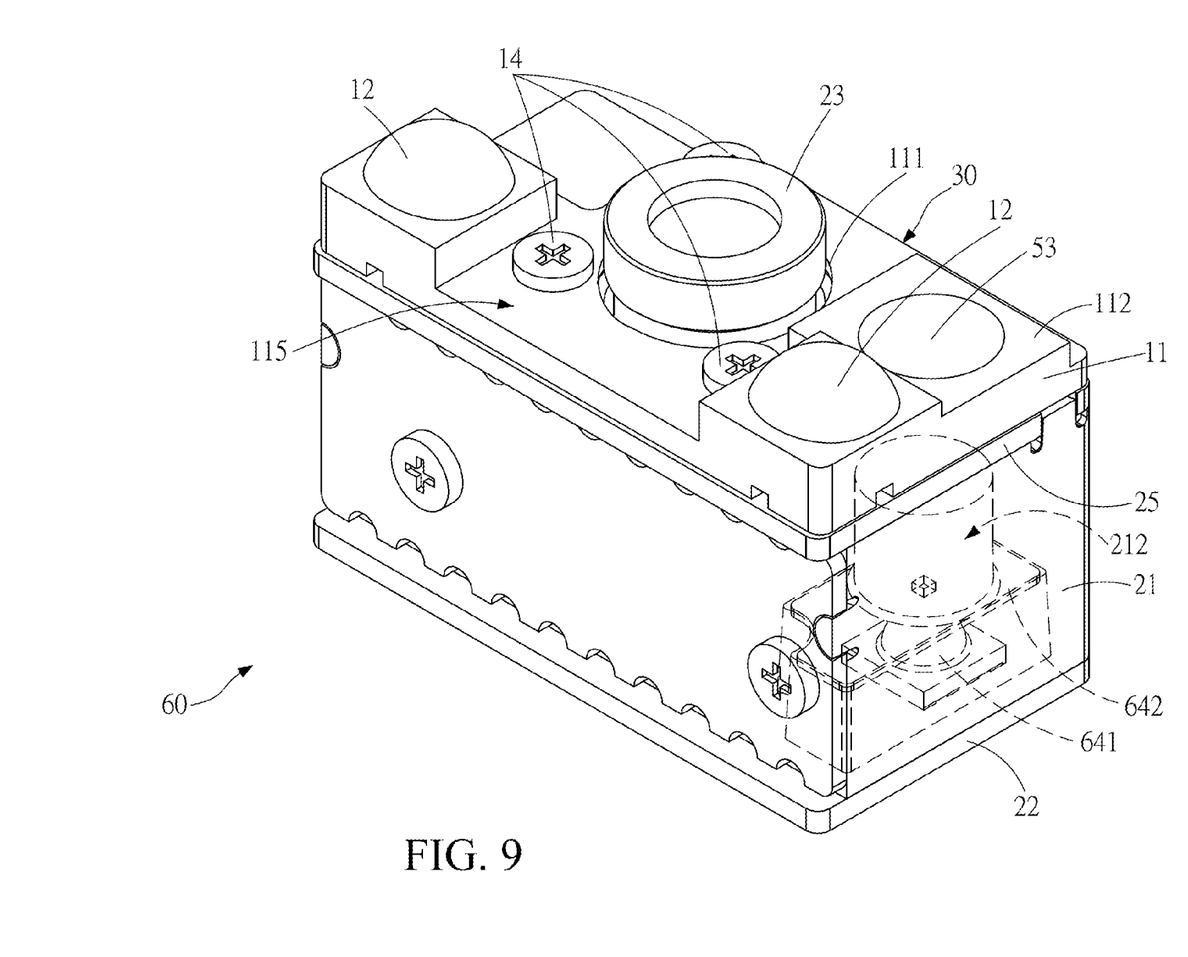
FIG. 9 is a perspective view of an image capturing device according to the third embodiment of the present invention.

Next, refer to FIG. 8 and FIG. 9, which are respectively perspective views of an optical component and an image capturing device using the same according to a third embodiment of the present invention. Those same between an optical component 50 in this embodiment and the optical component in the first embodiment are represented by same element numerals, and are no longer elaborated herein. A difference lies in that a collimating optical element in this embodiment is an optical diffusion element 53. As can be seen from FIG. 8, the optical diffusion element 53 and a groove 112 of a substrate 11 are an integrated and inseparable structure. In another aspect, a circular hole may also penetrate into the groove, and then the optical diffusion element is placed in the groove in a manner of tight fitting or adhesion, so as to be combined with the substrate, and the center of the optical diffusion element is located in the circular hole. By using the integration manner in this embodiment, time of fabrication and assembly of elements can be reduced, so as to shorten a process and reduce fabrication cost.

In addition, a difference between an image capturing device 60 in this embodiment and that in the first embodiment lies in that a used collimated light source includes a light-emitting diode 641 and an aperture element 642. As shown in FIG. 9, the light-emitting diode 641 is arranged on a first circuit board 22, and the aperture element 642 is arranged on a side, near the light-emitting diode 641, of a body 21, and covers a second through hole 212. A collimated light ray emitted by the light-emitting diode 641 passes through the aperture element 642 and then is cast by the optical diffusion element 53, so as to indicate the center of a readable range of an image capturing lens 23.

As can be seen from the foregoing three embodiments, for an optical component of the present invention, a corresponding collimating optical element may be arranged in cooperation with a collimated light source required to be used, so as to meet a use demand. Moreover, regardless of the type of a collimating optical element, the collimating optical element may be arranged on the optical component of the present invention, so that optical elements required by an image capturing device are all located on a same component. In this way, the number of elements to fabricate and time and cost of fabricating the elements are reduced, an assembly procedure is greatly simplified, assembly time is shortened, and flexibility in element replacement is also provided.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical component of an image capturing device, comprising:
   a substrate, provided with a perforation, a groove, and two opposite long sides, wherein the perforation is located between the two long sides, the groove is arranged to be concave from a surface of the substrate towards the other surface to protrude from the other surface, and the groove is located at an end of one of the long sides; and
   two optical lenses, separately arranged to be convex from the other surface of the substrate and located at two ends of the other long side of the substrate, wherein the two optical lenses and the substrate are an integrated and inseparable structure.

2. The optical component according to claim 1, further comprising a collimating optical element arranged in the groove.

3. The optical component according to claim 2, wherein the collimating optical element is a grating element.

4. The optical component according to claim 3, wherein the grating element and the substrate are an integrated and inseparable structure.

5. The optical component according to claim 2, wherein the collimating optical element is a diffraction optical element.

6. The optical component according to claim 5, wherein a penetrating hole is provided at the center of the groove.

7. The optical component according to claim 2, wherein the collimating optical element is an optical diffusion element.

8. The optical component according to claim 7, wherein the optical diffusion element and the substrate are an integrated and inseparable structure.

9. An image capturing device, comprising:
   a body, comprising a first through hole and a second through hole;
   a first circuit board, securely arranged on the body;
   an image capturing lens, arranged in the first through hole;
   a collimated light source, arranged on the first circuit board and corresponding to the second through hole;
   a second circuit board, securely arranged on a side, opposite the first circuit board, of the body;
   two light-emitting elements, arranged on the second circuit board; and the optical component according to claim 1, arranged on the second circuit board and securely connected to the body, wherein the two optical lenses correspondingly cover the two light-emitting elements, respectively, and the groove correspondingly covers the second through hole.

\* \* \* \* \*